(No Model.)
I. P. MORRILL.
COMBINED KITCHEN TABLE AND FLOUR SIFTER.
No. 502,630. Patented Aug. 1, 1893.
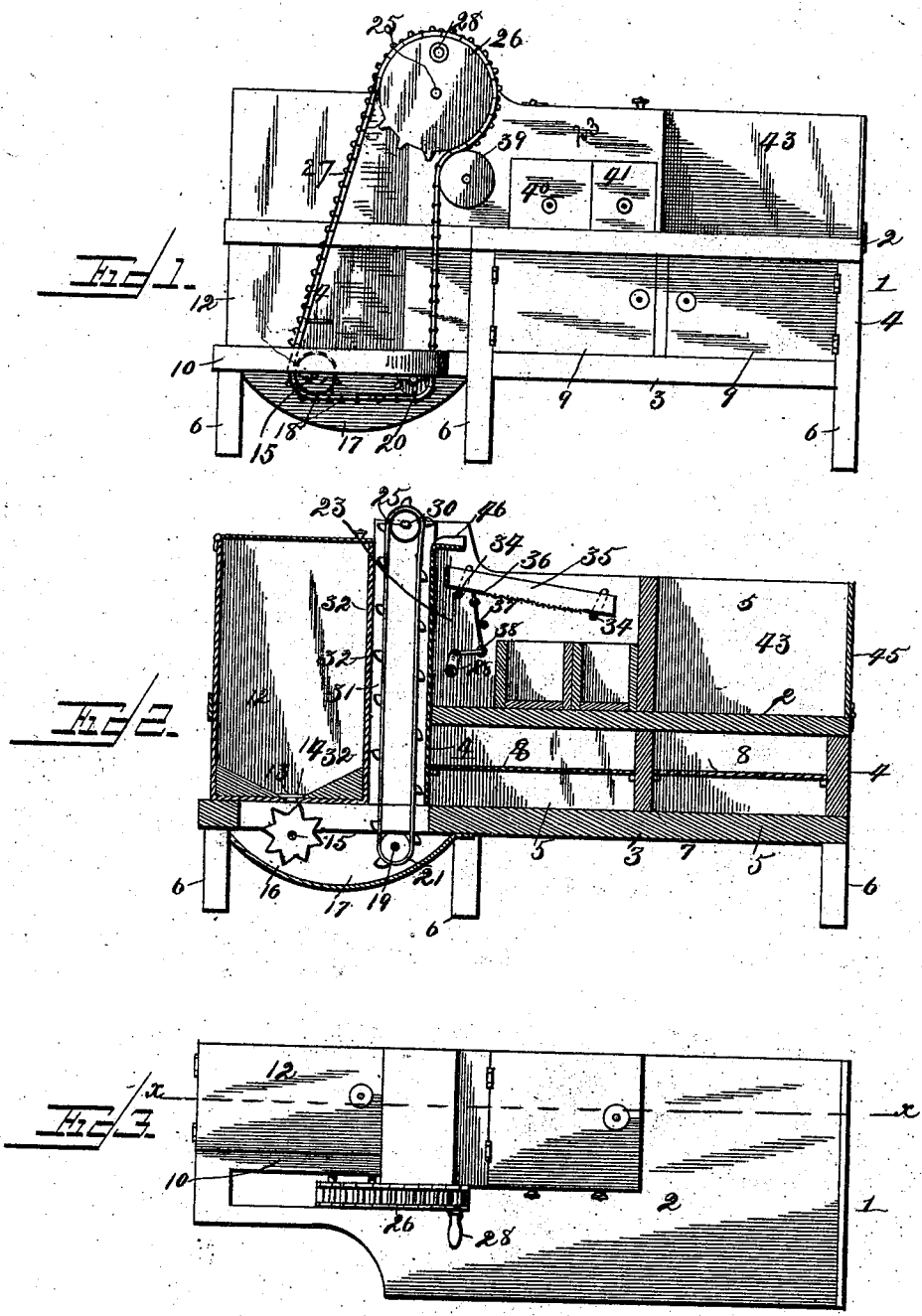
WITNESSES:
F. L. Ouvand
Jo. D. Coombs
INVENTOR:
Ichabod P. Morrill,
by Louis Bagger & Co.,
Attorneys.

UNITED STATES PATENT OFFICE.

ICHABOD P. MORRILL, OF NOBLE, MICHIGAN.

COMBINED KITCHEN-TABLE AND FLOUR-SIFTER.

SPECIFICATION forming part of Letters Patent No. 502,630, dated August 1, 1893.

Application filed January 23, 1893. Serial No. 459,368. (No model.)

*To all whom it may concern:*

Be it known that I, ICHABOD P. MORRILL, a citizen of the United States, and a resident of Noble, in the county of Branch and State of Michigan, have invented certain new and useful Improvements in a Combined Kitchen-Table and Flour-Sifter; and I do hereby declare that the following is a full, clear, and exact description of the invention, which will enable others skilled in the art to which it appertains to make and use the same, reference being had to the accompanying drawings, which form a part of this specification.

My invention relates to improvements in articles of kitchen furniture comprising a table with receptacles for bread and other articles of food, a level top for mixing and kneading dough and other purposes, a flour bin, provided with a feed wheel and means for actuating the same, an elevator belt for conveying the flour to a vibrating sieve or sifter, a receptacle for receiving the sifted flour, and a receptacle for the unsifted flour, the whole being so combined and arranged as to afford a very convenient article for kitchen use.

The invention consists in the novel construction and combination of parts hereinafter fully described and claimed.

In the accompanying drawings: Figure 1 is a side elevation of a combined kitchen table and flour sifter constructed in accordance with my invention. Fig. 2 is a longitudinal section of the same on the line x—x, Fig. 3. Fig. 3 is a plan view.

In the said drawings the reference numeral 1 designates a table provided with a top, 2, a bottom, 3, end walls, 4, a back wall, 5, and legs, 6, divided by means of a partition, 7, into two compartments, 8, for bread and other articles, said compartments being provided with hinged doors, 9. The bottom, 3, is provided with a horizontal extension, 10, which supports a flour bin, 12, provided at its bottom with an opening, 13, and a valve, 14. Journaled in this extension, 10, is a transverse shaft, 15, carrying a fluted feed roller, 16, which is located in a housing, 17, secured to the under side of said extension. One end of this shaft is provided with a sprocket wheel, 18.

In front of and a little below the shaft, 15, is a transverse shaft, 19, provided at its outer end with a sprocket wheel, 20, and at or near its center inside of the housing with a shaft or roller, 21.

Journaled in a rectangular box, 23, supported on the top of the table, at one end thereof, is a shaft, 25, provided with a sprocket wheel, 26, around which and sprocket wheels, 18 and 20, passes a chain, 27. This wheel, 26, is provided with a crank, 28. The shaft, 25, is provided with a roller, 30, similar to roller, 21, and over these rollers passes an elevator belt, 31, provided with buckets, 32.

Loosely resting on transverse bars, 34, in the upper part of box, 23, is a sleeve, 35, consisting of a rectangular plate of wire gauze or perforated metal, provided with a downwardly depending arm, 36, connected with an arm, 37, which in turn is connected with a crank shaft, 38, journaled in said box and provided at one end with a friction wheel, 39, with which the sprocket chain, 27, engages. Underneath this sieve are two drawers, 40 and 41. One of these drawers, 40, receives the sifted flour, while the other receives the coarse flour and lumps which cannot pass through the meshes or perforations of the sieve.

At the rear of the table top at one end is an upwardly extending wall, 43, to prevent articles from falling off and also with a hinged shelf, 45, which may be folded up vertically or extended out horizontally to receive and hold loaves of bread or other articles or objects. A spout, 46, is located above the sieve to convey the flour from the elevator thereto.

The manner of using my improved table and sifter is as follows: The flour is contained in the bin, and when it is desired to sift the same the valve in the bottom thereof is opened and rotary motion is imparted to the feed wheel by means of the sprocket wheels and chain. This will cause the flour to be fed to the elevator chains which carry the same up and deliver it to the sieve, to which a vibrating movement is given by means of the crank shaft and connections and the friction wheel 39 and chain 27. The sifted flour will fall into drawer, 40, while the coarse flour, lumps, and any refuse will be deposited in drawer, 41.

The level top of the table can be used for mixing and kneading purposes, and the receptacle or compartments, 8, can be used for bread and other articles.

From the above it will be seen that I provide a very useful article of kitchen furniture in which the different parts are so arranged and located with respect to each other as to be within convenient and easy reach of the person using the same.

Having thus described my invention, what I claim is—

A combined kitchen table and flour sifter, comprising the table with receptacles or compartments therein, the extension and housing, the flour bin supported on said extension provided with a valve in its bottom, the transverse shaft 15, located beneath said bin and provided with a fluted feed roller 16, and a sprocket wheel 18, at one end, the rectangular box 23, supported on said table, the transverse shafts 19 and 25, journaled therein, provided with sprocket wheels 20 and 26, the chain 27, passing over said wheels, the elevator belt 31, provided with buckets 32, the rollers 21 and 30, over which said belt passes, the vibrating sieve, the crank shaft having a friction wheel 39, over which chain 27 passes and the arms connecting said shaft and sieve, substantially as described.

In testimony that I claim the foregoing as my own I have hereunto affixed my signature in presence of two witnesses.

ICHABOD P. MORRILL.

Witnesses:
W. H. COMPTON,
C. P. MORRILL.